US008805278B2

(12) United States Patent
Li

(10) Patent No.: US 8,805,278 B2
(45) Date of Patent: Aug. 12, 2014

(54) MAIN BOARD, AND METHOD OF IMPLEMENTING NETWORK/CARD LOCKING AND MOBILE TERMINAL IN WHICH NETWORK/CARD LOCKING IS IMPLEMENTED

(75) Inventor: Chunyu Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 91 days.

(21) Appl. No.: 13/258,674

(22) PCT Filed: Apr. 28, 2010

(86) PCT No.: PCT/CN2010/072304

§ 371 (c)(1),
(2), (4) Date: Apr. 13, 2012

(87) PCT Pub. No.: WO2010/145339

PCT Pub. Date: Dec. 23, 2010

(65) Prior Publication Data

US 2012/0190334 A1 Jul. 26, 2012

(30) Foreign Application Priority Data

Oct. 13, 2009 (CN) .......................... 2009 1 0235736

(51) Int. Cl.
*H04B 7/00* (2006.01)
*H04B 1/16* (2006.01)
*H04W 72/00* (2009.01)
*H04W 24/00* (2009.01)
*H04M 1/00* (2006.01)

(52) U.S. Cl.
USPC .... 455/41.2; 455/343.2; 455/450; 455/456.1; 455/553.1; 342/457

(58) Field of Classification Search
CPC .... H04W 84/18; H04W 88/06; H04M 1/7253
USPC .................. 455/41.2, 343, 450, 456.1, 457; 342/457
See application file for complete search history.

(56) References Cited

U.S. PATENT DOCUMENTS 6,519,465 B2 * 2/2003 Stilp et al. .................. 455/456.1
6,782,264 B2 * 8/2004 Anderson .................. 455/456.1
(Continued)

FOREIGN PATENT DOCUMENTS

CN 101026834 A 8/2007
CN 101026934 A 8/2007
(Continued)

OTHER PUBLICATIONS

Supplementary European Search Report in European application No. 10788735.8, mailed on Mar. 12, 2013.
(Continued)

*Primary Examiner* — William D Cumming
(74) *Attorney, Agent, or Firm* — Oppedahl Patent Law Firm LLC

(57) ABSTRACT

The disclosure discloses a main board, wherein the main board includes: a first pad; a second pad connected to the first pad; and a third pad connected to both the first pad and the second pad. The disclosure also discloses a method of implementing network/card locking, wherein the method includes: transmitting, by an encryption chip, a blocking request to a central processing unit when the encryption chip detects authentication-related information that is provided by a user identification unit to the central processing unit, and determines that the authentication-related information does not meet a preset network/card locking requirement from a mobile operator; blocking, by the central processing unit, the mobile terminal from normal operation when receiving the blocking request. Meanwhile, the disclosure also discloses a mobile terminal in which network/card locking is implemented, wherein the mobile terminal includes a central processing unit, a user identification unit and an encryption chip. By using the main board, the method and the mobile terminal of the disclosure, the costs for producing a mobile terminal which is respectively adapted to different sales modes of mobile terminals can be reduced.

13 Claims, 3 Drawing Sheets

(56) References Cited

U.S. PATENT DOCUMENTS

| | | | |
|---|---|---|---|
| 6,876,859 B2* | 4/2005 | Anderson et al. | 455/456.1 |
| 7,167,713 B2* | 1/2007 | Anderson | 455/456.1 |
| 7,271,765 B2* | 9/2007 | Stilp et al. | 342/457 |
| 7,596,366 B2* | 9/2009 | Van Bosch et al. | 455/343.2 |
| 7,596,649 B2 | 9/2009 | Hsu et al. | |
| 7,653,397 B2* | 1/2010 | Pernu et al. | 455/450 |
| 7,668,565 B2* | 2/2010 | Ylanen et al. | 455/553.1 |
| 7,693,486 B2* | 4/2010 | Kasslin et al. | 455/41.2 |
| 7,778,603 B2* | 8/2010 | Palin et al. | 455/41.2 |
| 7,783,256 B2* | 8/2010 | Bocking et al. | 455/41.2 |
| 2006/0009196 A1 | 1/2006 | Lai | |
| 2007/0189532 A1 | 8/2007 | Onozu | |
| 2008/0059685 A1 | 3/2008 | Hsu et al. | |

FOREIGN PATENT DOCUMENTS

| | | |
|---|---|---|
| CN | 101098540 A | 1/2008 |
| CN | 101136003 A | 3/2008 |
| CN | 101281503 A | 10/2008 |
| CN | 101437067 A | 5/2009 |

OTHER PUBLICATIONS

International Search Report in international application No. PCT/CN2010/072304, mailed on Aug. 5, 2010.

English Translation of the Written Opinion of the International Search Authority in international application No. PCT/CN2010/072304, mailed on Aug. 5, 2010.

English Translation of First Office Action, The State Intellectual Property Office of China, Application No. 200910235736.6, ZTE Corporation, issued Feb. 20, 2014.

* cited by examiner

MAIN BOARD, AND METHOD OF IMPLEMENTING NETWORK/CARD LOCKING AND MOBILE TERMINAL IN WHICH NETWORK/CARD LOCKING IS IMPLEMENTED

TECHNICAL FIELD

The disclosure relates to the field of mobile communications, and in particular to a main board, and a method of implementing network/card locking and a mobile terminal in which network/card locking is implemented.

BACKGROUND

At present, various mobile operators perform promotions by way of price subsidies to attract mobile terminal users to use their networks. Particularly, a mobile operator sells mobile terminals to customers at prices below costs, or even presents mobile terminals to customers for free; meanwhile, such mobile terminals are locked to network of the mobile operator or are locked to mobile terminal cards sold by the mobile operator. That is to say, mobile terminals sold at prices below costs or presented have a network locking function.

A device is disclosed in the Chinese patent application entitled "Mobile Terminal Network Locking Device Based on Encryption chip", published on Jan. 2, 2008 with the publication No. CN101098540A. As shown in FIG. 1, the device includes an encryption chip, a central processing unit and a user identification unit; wherein the encryption chip is serially connected between the central processing unit and the user identification unit, and configured to transfer and detect communication information between the central processing unit and the user identification unit. When the encryption chip detects the communication information including an International Mobile Subscriber Identification (IMSI) number that does not meet a network locking requirement from a mobile operator, the encryption chip interrupts the communication between the central processing unit and the user identification unit, to cause the mobile terminal unable to operate normally, that is, to perform the network locking function of the mobile terminal.

In terms of sales of mobile terminals, selling mobile terminals at prices below costs or presenting them for free is only one of many sales modes for mobile terminals, and other sales modes than the above sales mode do not require the mobile terminals to be sold to have the network locking function. However, during production of mobile terminals, it is obvious that, for a main board obtained by wiring according to the above patent application, wires between the central processing unit and the user identification unit of the main board are disconnected. If no encryption chip is connected, the central processing unit is unable to communicate with the user identification unit, then the mobile terminal is unable to operate normally. Therefore, for a mobile terminal which is manufactured without the network locking function, it is also necessary to arrange an encryption chip therein. However, for such a mobile terminal, in which no network locking requirement from the mobile operator is preset in the encryption chip, such that the network locking function is turned off. Obviously, this will leave the encryption chip unused, and as a result, hardware resources are wasted and costs are increased. Alternatively, a main board may be redesigned for a mobile terminal which do not need the network locking function, so as to connect the central processing unit and the user identification unit. However, in this way, expenses for designing, testing and verifying the main board are increased, and thus costs are increased.

SUMMARY

Therefore, the first purpose of the disclosure is to provide a main board applicable for both a mobile terminal without network locking function and a mobile terminal with network locking function.

The second purpose of the disclosure is to provide a method of implementing network/card locking and a mobile terminal in which network/card locking is implemented by using the aforementioned main board.

In order to achieve the first purpose, the technical solution of the disclosure is implemented as follows.

A main board for a mobile terminal, wherein the main board includes: a first pad; a second pad connected to the first pad; and a third pad connected to both the first pad and the second pad; wherein the first pad is configured to connect to a user identification unit;

the second pad is configured to connect to a central processing unit;

the third pad is configured to connect to an encryption chip;

wherein, when implementing network/card locking, the user identification unit, the central processing unit and the encryption chip are connected to the main board; the user identification unit authenticates a mobile terminal user by communication with the central processing unit; the encryption chip detects whether the communication meets a preset network/card locking requirement from a mobile operator, and blocks the mobile terminal from normal operation when the communication does not meet the preset requirement;

when not implementing network/card locking, the user identification unit and the central processing unit are connected to the main board, and the encryption chip is not connected to the main board; the user identification unit authenticates a mobile terminal user by communication with the central processing unit.

In order to achieve the second purpose, the technical solution of the disclosure is implemented as follows.

A method of implementing network/card locking, a user identification unit communicates with a central processing unit, and an encrypted unit communicates with both the user identification unit and the central processing unit; a network/card locking requirement from a mobile operator is preset for the mobile terminal.

when a mobile terminal user is authenticated, the method further includes:

transmitting, by the encryption chip, a blocking request to the central processing unit when the encryption chip detects authentication-related information that is provided by the user identification unit to the central processing unit, and determines that the authentication-related information does not meet the preset network/card locking requirement from the mobile operator;

receiving and processing, by the central processing unit the authentication-related information; blocking, by the central processing unit, the mobile terminal from normal operation when receiving the blocking request.

Furthermore, the authentication-related information may include: an IMSI and an authentication algorithm; the IMSI is composed of a Mobile Country Code (MCC), a Mobile Network Code (MNC) and a Mobile Identification Number (MIN);

when implementing network locking, the network/card locking requirement from the mobile operator may include: the MCC in the IMSI included in the authentication-related information is consistent with an MCC of network of the mobile operator, and the MNC in the IMSI included in the authentication-related information is consistent with an MNC of network of the mobile operator;

the determining that the authentication-related information does not meet the preset network/card locking requirement from the mobile operator may include:

determining the authentication-related information as not meeting the preset network/card locking requirement from the mobile operator when it is determined that the MCC in the IMSI included in the authentication-related information is inconsistent with the MCC of network of the mobile operator, and/or the MNC in the IMSI included in the authentication-related information is inconsistent with the MNC of network of the mobile operator.

Furthermore, when implementing card locking, the network/card locking requirement from the mobile operator may include: the MIN in the IMSI included in the authentication-related information is within a number segment specified by the mobile operator;

wherein the determining that the authentication-related information does not meet the preset network/card locking requirement from the mobile operator may include:

determining the authentication-related information as not meeting the preset network/card locking requirement from the mobile operator when it is determined that the MIN in the IMSI included in the authentication-related information is not within the number segment specified by the mobile operator.

Furthermore, when the blocking request is a single pulse, the transmitting the blocking request to the central processing unit may include: transmitting a single pulse to a pin "Reset" of the central processing unit;

the blocking the mobile terminal from normal operation may include: triggering the pin "Reset" by the single pulse, such that the mobile terminal is reset.

Furthermore, the blocking the mobile terminal from normal operation may include:

interrupting an authentication process of a mobile terminal user, through not transmitting, by the central processing unit, the received authentication-related information to a base station; or, disabling, by the central processing unit, a call module and/or a short message sending and receiving module of the mobile terminal; wherein, the call module is configured to perform voice services of the mobile terminal; the short message sending and receiving module is configured to perform short message sending and receiving services of the mobile terminal.

The disclosure also provides a mobile terminal in which network/card locking is implemented, wherein the mobile terminal includes: a main board, a central processing unit, a user identification unit and an encryption chip; wherein the main board includes: a first pad; a second pad connected to the first pad; and a third pad connected to both the first pad and the second pad;

the user identification unit is connected to the first pad, and is configured to provide the central processing unit with authentication-related information for authenticating a mobile terminal user;

the central processing unit is connected to the second pad, and is configured to receive and process the authentication-related information, and to block the mobile terminal from normal operation when receiving a blocking request from the encryption chip;

the encryption chip is connected to the third pad, and is configured to transmit the blocking request to the central processing unit when detecting that the authentication-related information provided by the user identification unit to the central processing unit does not meet a preset network/card locking requirement from a mobile operator.

Furthermore, the authentication-related information may include: an IMSI and an authentication algorithm; the IMSI is composed of an MCC, an MNC and an MIN;

when implementing network locking, the network locking requirement from the mobile operator may include: the MCC in the IMSI included in the authentication-related information being consistent with an MCC of network of the mobile operator, and the MNC in the IMSI included in the authentication-related information being consistent with an MNC of network of the mobile operator; and wherein the encryption chip may include a first detection module and a first request module; wherein the first detection module is configured to trigger the first request module, when detecting that the MCC in the IMSI included in the authentication-related information that is provided by the user identification unit to the central processing unit is inconsistent with the MCC of network of the mobile operator, and/or the MNC in the IMSI included in the authentication-related information is inconsistent with the MNC of network of the mobile operator; and the first request module is configured to transmit the blocking request to the central processing unit.

Furthermore, when implementing card locking, the network/card locking requirement from the mobile operator may include: the MIN in the IMSI included in the authentication-related information being within a number segment specified by the mobile operator;

wherein the encryption chip may include a second detection module and a second request module; and wherein the second detection module is configured to trigger the second request module, when detecting that the MIN in the IMSI included in the authentication-related information that is provided by the user identification unit to the central processing unit is not within the number segment specified by the mobile operator; and the second request module is configured to transmit the blocking request to the central processing unit.

Furthermore, the central processing unit may include: an authentication module and a control module; and wherein the authentication module is configured to receive and process the authentication-related information;

the control module is configured to block the mobile terminal from normal operation when receiving the blocking request from the encryption chip.

Furthermore, when the blocking request is a single pulse, the control module may be implemented as a pin "Reset" of the central processing unit, and wherein the pin "Reset" is triggered by the single pulse from the encryption chip, such that the mobile terminal is reset.

Furthermore, the control module may block the mobile terminal from normal operation by blocking the authentication module from transmitting the received authentication-related information to a base station, so as to interrupt an authentication process being performed for a mobile terminal user.

Furthermore, The mobile terminal may further include: a call module and/or a short message sending and receiving module;

the main board may further include: a fourth pad connected to the second pad; and/or a fifth pad connected to the second pad;

wherein the call module is connected to the fourth pad, and is configured to perform voice services of the mobile terminal;

the short message sending and receiving module is connected to the fifth pad, and is configured to perform short message sending and receiving services of the mobile terminal; and wherein the control module may block the mobile terminal from normal operation by disabling the call module and/or the short message sending and receiving module of the mobile terminal.

For the main board, the method of implementing network/card locking and the mobile terminal in which network/card locking is implemented provided in the disclosure, the first pad connected to the user identification unit is connected to the second pad connected to the central processing unit, and the third pad connected to the encryption chip is connected to both the first pad and the second pad. In this way, it may implement network/card locking by connecting the user identification unit, the central processing unit and the encryption chip to the main board. When the implementing network/card locking is not required, a mobile terminal user may be authenticated by connecting the user identification unit and the central processing unit to the main board, while without connecting the encryption chip to the main board, such that the mobile terminal can operate normally. It can be seen that the main board provided by the disclosure is applicable for both a mobile terminal without network locking function and a mobile terminal with network locking function, thereby reducing costs for producing a mobile terminal which is respectively adapted to different sales modes of mobile terminals.

The method and the device of the disclosure also have the following advantages and features: with features such as protocol authentication and encrypted message transmission, an encryption chip cannot be decrypted so far, therefore, realization of detecting communication and transmitting a blocking request by the encryption chip can prevent the first detection module and the first request module, or the second detection module and the second request module included by the encryption chip from being tampering, thereby realizing higher security.

DETAILED DESCRIPTION

A main board according to embodiment 1 of the disclosure includes a first pad, a second pad and a third pad; wherein the first pad is connected to the second pad, and the third pad is connected to both the first pad and the second pad; wherein the first pad is configured to connect to a user identification unit;

the second pad is configured to connect to a central processing unit;

the third pad is configured to connect to an encryption chip;

wherein, when implementing network/card locking, the user identification unit, the central processing unit and the encryption chip are connected to the main board; the user identification unit authenticates a mobile terminal user by communication with the central processing unit; the encryption chip detects whether the communication meets a preset network/card locking requirement from a mobile operator and blocks the mobile terminal from normal operation when the communication does not meet the preset requirement;

when not implementing network/card locking, the user identification unit and the central processing unit are connected to the main board, and the encryption chip is not connected to the main board; the user identification unit authenticates a mobile terminal user by communication with the central processing unit.

Figure 1:
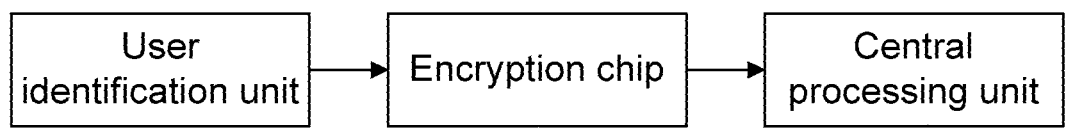
FIG. 1 shows a schematic structural diagram of a mobile terminal network locking device based on an encryption chip.
Figure 2:
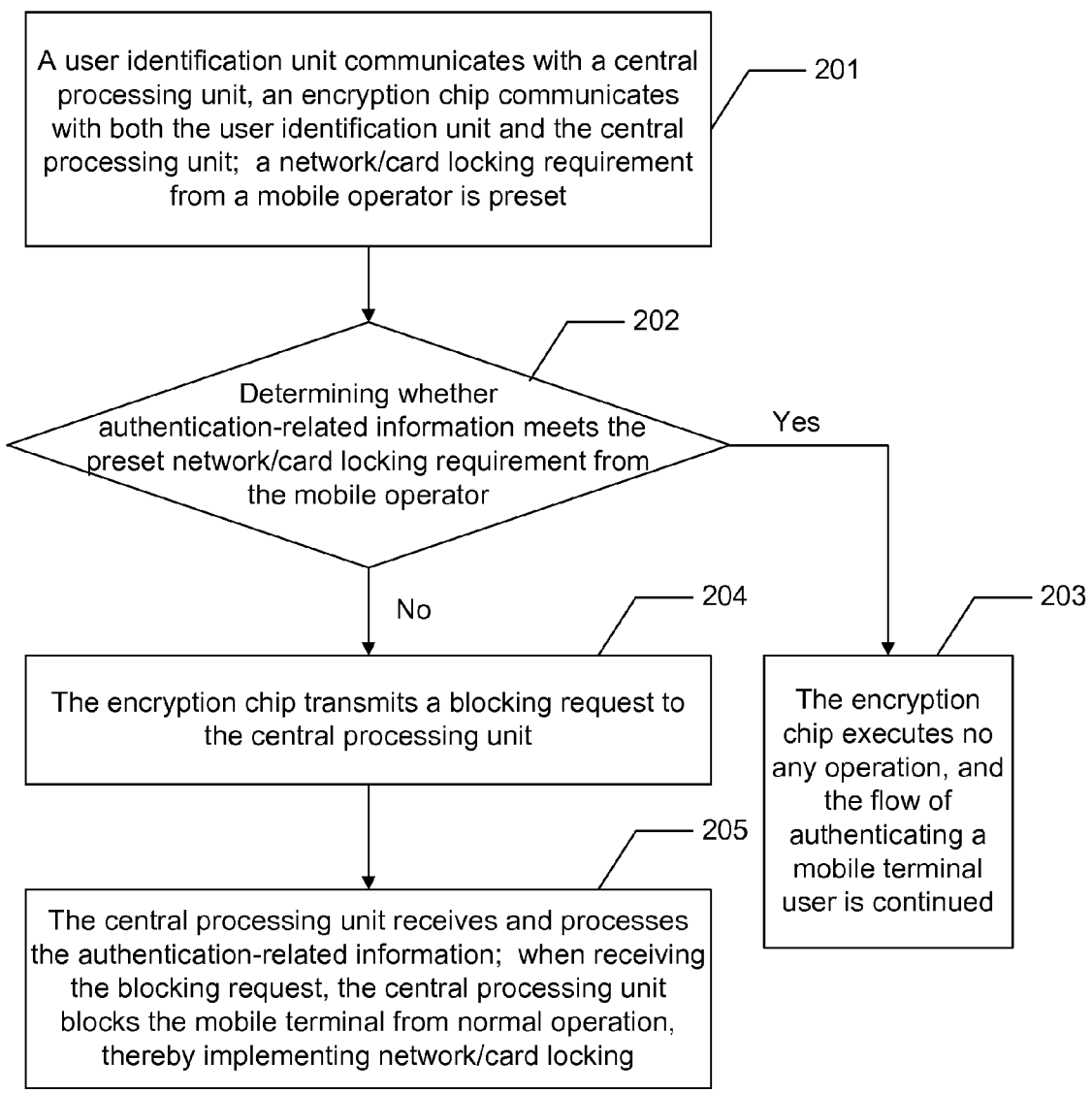
FIG. 2 shows a flow chart of a method of implementing network/card locking according to embodiment 2 of the disclosure.

FIG. 2 shows a flow of the method of implementing network/card locking according to embodiment 2 of the disclosure, wherein the method includes the following steps.

Step 201: the user identification unit communicates with the central processing unit, the encryption chip communicates with both the user identification unit and the central processing unit; a network/card locking requirement from a mobile operator is preset;

herein, most mobile operators will require mobile terminals to lock their own networks, that is, require the mobile terminals to be able to implement network locking, however, some mobile operators only provide mobile services within a certain or some number segment(s), so they will require the mobile terminals to lock their own number segment, that is, require the mobile terminals to be able to implement card locking;

wherein, when implementing network locking, a Mobile Country Code (MCC) in an IMSI included in authentication-related information is consistent with an MCC of network of the mobile operator, and a Mobile Network Code (MNC) in the IMSI included in the authentication-related information is consistent with an MNC of network of the mobile operator; when implementing card locking, a Mobile Identification Number (MIN) in the IMSI included in the authentication-related information is within a number segment specified by the mobile operator.

According to an embodiment of the disclosure, Steps 202-205 are executed when authenticating a mobile terminal user.

Step 202: when the encryption chip detects the authentication-related information that is provided by the user identification unit to the central processing unit, the encryption chip determines whether the authentication-related information meets the preset network/card locking requirement from the mobile operator, if so, Step 203 is executed, otherwise, Steps 204 and 205 are executed.

Wherein, the user identification module may be a Subscriber Identity Module (SIM) or a User Identification Module (UIM) and so on.

The authentication-related information includes: an IMSI and an authentication algorithm; the IMSI is composed of an MCC, an MNC and an MIN.

The step that the encryption chip detects the authentication-related information that is provided by the user identification unit to the central processing unit is specifically as follows:

the encryption chip detects information that is sent by the user identification unit to the central processing unit, and analyzes that the information includes an IMSI, then it will be reconsidered that the encryption chip detects the authentication-related information that is provided by the user identification unit to the central processing unit.

When implementing network locking, the step that the encryption chip determines whether the authentication-related information meets the preset network/card locking requirement from the mobile operator includes that:

the encryption chip determines whether the MCC in the IMSI included in the authentication-related information is consistent with the MCC of network of the mobile operator, and whether the MNC in the IMSI included in the authentication-related information is consistent with the MNC of network of the mobile operator, if both are consistent, determines the authentication-related information as meeting the preset network/card locking requirement from the mobile operator, otherwise, determines the authentication-related information as not meeting the preset network/card locking requirement from the mobile operator.

When implementing card locking, the step that the encryption chip determines whether the authentication-related information meets the preset network/card locking requirement from the mobile operator includes that:

the encryption chip determines whether the MIN in the IMSI included in the authentication-related information is within a number segment specified by the mobile operator, if so, determines the authentication-related information as meeting the preset network/card locking requirement from the mobile operator, otherwise, determines the authentication-related information as not meeting the preset network/card locking requirement from the mobile operator.

Step 203: the encryption chip executes no any operation, and the flow of authenticating the mobile terminal user is continued.

Step 204: the encryption chip transmits a blocking request to the central processing unit;

herein, when the blocking request is a single pulse, the transmitting a blocking request to the central processing unit includes: transmitting a single pulse to a pin "Reset" of the central processing unit.

Step 205: the central processing unit receives and processes the authentication-related information; when receiving the blocking request, the central processing unit blocks the mobile terminal from normal operation, thereby implementing network/card locking.

Wherein, when the blocking request is a single pulse, the blocking the mobile terminal from normal operation includes: triggering the pin "Reset" by the single pulse such that the mobile terminal is reset; in this way, if the authentication-related information does not meet the preset network/card locking requirement from the mobile operator, the mobile terminal will repeat the flow of resetting and then continuing to authenticate the mobile terminal user, such that the mobile terminal is unable to operate normally.

Wherein the blocking the mobile terminal from normal operation may also include: interrupting the authentication process of the mobile terminal user, through not transmitting, by the central processing unit, the received authentication-related information to a base station, so, the authentication is failed, the mobile terminal is unable to access a mobile network, such that it is unable to operate normally.

Wherein the blocking the mobile terminal from normal operation may also include that: disabling, by the central processing unit, a call module and/or a short message sending and receiving module of the mobile terminal; wherein, the call module is configured to perform voice services of the mobile terminal; the short message sending and receiving module is configured to perform short message sending and receiving services of the mobile terminal; after the call module and/or short message sending and receiving module are disabled, the mobile terminal is unable to perform voice services and/or short message sending and receiving services, such that the mobile terminal is unable to operate normally.

Figure 3:
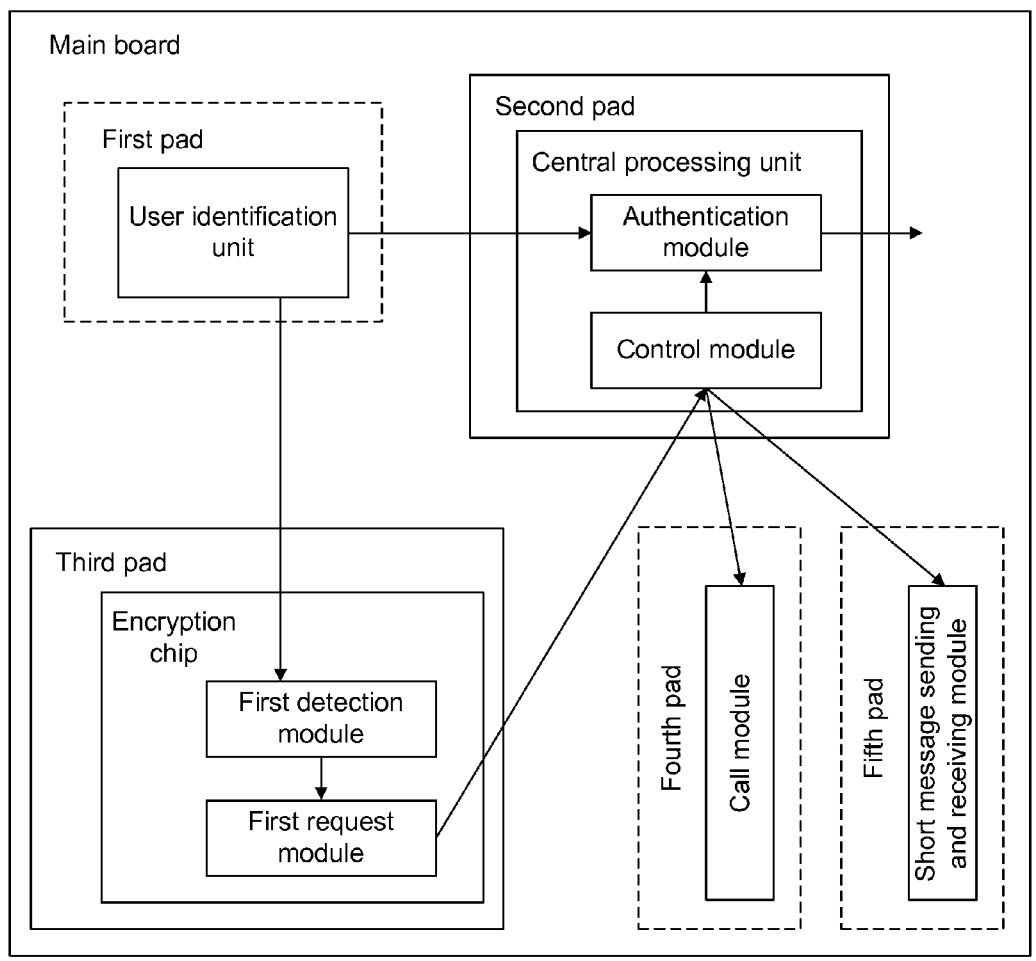
FIG. 3 shows a schematic structural diagram of a mobile terminal in which network/card locking is implemented according to embodiment 3 of the disclosure.

FIG. 3 shows a structure of a mobile terminal in which network locking is implemented according to embodiment 3 of the disclosure, including: a main board, a central processing unit, a user identification unit and an encryption chip; wherein the main board includes: a first pad, a second pad and a third pad; the first pad is connected to the second pad, and the third pad is connected to both the first pad and the second pad;

the user identification unit is connected to the first pad, and is configured to provide the central processing unit with authentication-related information for authenticating a mobile terminal user;

the central processing unit is connected to the second pad, and is configured to receive and process the authentication-related information, and to block the mobile terminal from normal operation when receiving a blocking request from the encryption chip;

the encryption chip is connected to the third pad, and is configured to transmit the blocking request to the central processing unit, when detecting the authentication-related information provided by the user identification unit to the central processing unit does not meet a preset network/card locking requirement from a mobile operator.

Wherein, the authentication-related information includes: an IMSI and an authentication algorithm; the IMSI is composed of an MCC, an MNC and an MIN;

the network/card locking requirement from the mobile operator includes: the MCC in the IMSI included in the authentication-related information being consistent with an MCC of network of the mobile operator, and the MNC in the IMSI included in the authentication-related information being consistent with an MNC of network of the mobile operator;

the encryption chip includes a first detection module and a first request module; wherein the first detection module is configured to trigger the first request module, when detecting that the MCC in the IMSI included in the authentication-related information that is provided by the user identification unit to the central processing unit is inconsistent with the MCC of network of the mobile operator, and/or the MNC in the IMSI included in the authentication-related information is inconsistent with the MNC of network of the mobile operator;

the first request module is configured to transmit the blocking request to the central processing unit.

Wherein, the central processing unit includes: an authentication module and a control module; wherein the authentication module is configured to receive and process the authentication-related information;

the control module is configured to block the mobile terminal from normal operation when receiving the blocking request from the encryption chip.

Furthermore, when the blocking request is a single pulse, the control module is implemented as a pin "Reset" of the central processing unit; wherein the pin "Reset" is triggered by the single pulse from the encryption chip, such that the mobile terminal is reset.

Furthermore, the control module may also block the mobile terminal from normal operation in a following way: blocking the authentication module from transmitting the received authentication-related information to a base station, so as to interrupt this authentication process being performed for the mobile terminal user.

Furthermore, the mobile terminal further includes: a call module and/or a short message sending and receiving module; the main board further includes: a fourth pad and/or a fifth pad, the fourth pad is connected to the second pad, and the fifth pad is connected to the second pad; wherein the call module is connected to the fourth pad, and is configured to perform voice services of the mobile terminal;

the short message sending and receiving module is connected to the fifth pad, and is configured to perform short message sending and receiving services of the mobile terminal;

wherein the control module blocks the mobile terminal from normal operation by disabling the call module and/or the short message sending and receiving module of the mobile terminal.

A mobile terminal in which card locking is implemented according to the embodiment 4 of the disclosure includes: a main board, a central processing unit, a user identification unit and an encryption chip; wherein the encryption chip is configured to transmit a blocking request to the central processing unit when detecting that authentication-related information provided by the user identification unit to the central processing unit does not meet a preset network/card locking requirement from a mobile operator.

Furthermore, the network/card locking requirement from the mobile operator includes: an MIN in an IMSI included in the authentication-related information is within a number segment specified by the mobile operator.

The encryption chip includes a second detection module and a second request module; wherein the second detection module is configured to trigger the second request module, when detecting that the MIN in the IMSI included in the authentication-related information that is provided by the user identification unit to the central processing unit is not within the number segment specified by the mobile operator;

the second request module is configured to transmit the blocking request to the central processing unit.

Except the encryption chip, other parts of the mobile terminal in which network/card locking is implemented according to embodiment 4 of the disclosure are similar to those of the mobile terminal in which network/card locking is implemented according to embodiment 3 of the disclosure; therefore no description will be repeatedly given here.

The mentioned above are only preferred embodiments of the disclosure but not limitation to the protection scope of the disclosure.

The invention claimed is:

1. A method of implementing network/card locking for a mobile terminal, wherein a main board of the mobile terminal is connected to a user identification unit, a central processing unit and an encryption chip of the mobile terminal; a network/card locking requirement from a mobile operator is preset for the mobile terminal, the method further comprising:
transmitting, by the encryption chip, a blocking request to the central processing unit when the encryption chip detects authentication-related information that is provided by the user identification unit to the central processing unit, and determines that the authentication-related information does not meet the preset network/card locking requirement from the mobile operator;
blocking, by the central processing unit, the mobile terminal from normal operation when receiving the blocking request,
wherein the authentication-related information comprises: an International Mobile Subscriber Identification (IMSI) and an authentication algorithm; and wherein the IMSI is composed of a Mobile Country Code (MCC), a Mobile Network Code (MNC) and a Mobile Identification Number (MIN);
wherein the network locking requirement from the mobile operator comprises: the MCC in the IMSI included in the authentication-related information being consistent with an MCC of network of the mobile operator, and the MNC in the IMSI included in the authentication-related information being consistent with an MNC of network of the mobile operator; and
wherein the determining that the authentication-related information does not meet the preset network locking requirement from the mobile operator comprises:
determining the authentication-related information as not meeting the preset network locking requirement from the mobile operator when it is determined that the MCC in the IMSI included in the authentication-related information is inconsistent with the MCC of network of the mobile operator, and/or the MNC in the IMSI included in the authentication-related information is inconsistent with the MNC of network of the mobile operator.

2. A method of implementing network/card locking for a mobile terminal, wherein a main board of the mobile terminal is connected to a user identification unit, a central processing unit and an encryption chip of the mobile terminal; a network/card locking requirement from a mobile operator is preset for the mobile terminal, the method further comprising:
transmitting, by the encryption chip, a blocking request to the central processing unit when the encryption chip detects authentication-related information that is provided by the user identification unit to the central processing unit, and determines that the authentication-related information does not meet the preset network/card locking requirement from the mobile operator;
blocking, by the central processing unit, the mobile terminal from normal operation when receiving the blocking request,
wherein the card locking requirement from the mobile operator comprises: the MIN in the IMSI included in the authentication-related information is within a number segment specified by the mobile operator;
wherein the determining that the authentication-related information does not meet the preset card locking requirement from the mobile operator comprises:
determining the authentication-related information as not meeting the preset card locking requirement from the mobile operator when it is determined that the MIN in the IMSI included in the authentication-related information is not within the number segment specified by the mobile operator.

3. A mobile terminal in which network/card locking is implemented, comprising: a main board, a central processing unit, a user identification unit and an encryption chip; wherein
the main board comprises: a first pad; a second pad connected to the first pad; and a third pad connected to both the first pad and the second pad;
the user identification unit is connected to the first pad, and is configured to provide the central processing unit with authentication-related information for authenticating a mobile terminal user;
the central processing unit is connected to the second pad, and is configured to receive and process the authentication-related information, and to block the mobile terminal from normal operation when receiving a blocking request from the encryption chip;

the encryption chip is connected to the third pad, and is configured to transmit the blocking request to the central processing unit when detecting that the authentication-related information provided by the user identification unit to the central processing unit does not meet a preset network/card locking requirement from a mobile operator, wherein, the authentication-related information comprises: an International Mobile Subscriber Identification (IMSI) and an authentication algorithm; the IMSI is composed of a Mobile Country Code (MCC), a Mobile Network Code (MNC) and a Mobile Identification Number (MIN);

wherein the network locking requirement from the mobile operator comprises: the MCC in the IMSI included in the authentication-related information being consistent with an MCC of network of the mobile operator, and the MNC in the IMSI included in the authentication-related information being consistent with an MNC of network of the mobile operator; and wherein the encryption chip comprises a first detection module and a first request module; wherein the first detection module is configured to trigger the first request module, when detecting that the MCC in the IMSI included in the authentication-related information that is provided by the user identification unit to the central processing unit is inconsistent with the MCC of network of the mobile operator, and/or the MNC in the IMSI included in the authentication-related information is inconsistent with the MNC of network of the mobile operator; and the first request module is configured to transmit the blocking request to the central processing unit.

4. A mobile terminal in which network/card locking is implemented, comprising: a main board, a central processing unit, a user identification unit and an encryption chip; wherein the main board comprises: a first pad; a second pad connected to the first pad; and a third pad connected to both the first pad and the second pad;

the user identification unit is connected to the first pad, and is configured to provide the central processing unit with authentication-related information for authenticating a mobile terminal user;

the central processing unit is connected to the second pad, and is configured to receive and process the authentication-related information, and to block the mobile terminal from normal operation when receiving a blocking request from the encryption chip;

the encryption chip is connected to the third pad, and is configured to transmit the blocking request to the central processing unit when detecting that the authentication-related information provided by the user identification unit to the central processing unit does not meet a preset network/card locking requirement from a mobile operator, wherein the card locking requirement from the mobile operator comprises: the MIN in the IMSI included in the authentication-related information being within a number segment specified by the mobile operator;

wherein the encryption chip comprises a second detection module and a second request module; and wherein the second detection module is configured to trigger the second request module, when detecting that the MIN in the IMSI included in the authentication-related information that is provided by the user identification unit to the central processing unit is not within the number segment specified by the mobile operator; and the second request module is configured to transmit the blocking request to the central processing unit.

5. A mobile terminal in which network/card locking is implemented, comprising: a main board, a central processing unit, a user identification unit and an encryption chip; wherein the main board comprises: a first pad; a second pad connected to the first pad; and a third pad connected to both the first pad and the second pad;

the user identification unit is connected to the first pad, and is configured to provide the central processing unit with authentication-related information for authenticating a mobile terminal user;

the central processing unit is connected to the second pad, and is configured to receive and process the authentication-related information, and to block the mobile terminal from normal operation when receiving a blocking request from the encryption chip;

the encryption chip is connected to the third pad, and is configured to transmit the blocking request to the central processing unit when detecting that the authentication-related information provided by the user identification unit to the central processing unit does not meet a preset network/card locking requirement from a mobile operator, wherein the central processing unit comprises: an authentication module and a control module; and wherein the authentication module is configured to receive and process the authentication-related information;

the control module is configured to block the mobile terminal from normal operation when receiving the blocking request from the encryption chip.

6. The mobile terminal in which network/card locking is implemented according to claim 5, wherein the control module blocks the mobile terminal from normal operation by blocking the authentication module from transmitting the received authentication-related information to a base station, so as to interrupt an authentication process being performed for a mobile terminal user.

7. The mobile terminal in which network/card locking is implemented according to claim 5, further comprising: a call module and/or a short message sending and receiving module;

the main board further comprises: a fourth pad connected to the second pad; and/or a fifth pad connected to the second pad;

wherein the call module is connected to the fourth pad, and is configured to perform voice services of the mobile terminal;

the short message sending and receiving module is connected to the fifth pad, and is configured to perform short message sending and receiving services of the mobile terminal; and wherein the control module blocks the mobile terminal from normal operation by disabling the call module and/or the short message sending and receiving module of the mobile terminal.

8. The mobile terminal in which network/card locking is implemented according to claim 3, wherein the central processing unit comprises: an authentication module and a control module; and wherein the authentication module is configured to receive and process the authentication-related information;

the control module is configured to block the mobile terminal from normal operation when receiving the blocking request from the encryption chip.

9. The mobile terminal in which network/card locking is implemented according to claim 4,
wherein the central processing unit comprises: an authentication module and a control module; and wherein
the authentication module is configured to receive and process the authentication-related information;
the control module is configured to block the mobile terminal from normal operation when receiving the blocking request from the encryption chip.

10. The mobile terminal in which network/card locking is implemented according to claim 8,
wherein the control module blocks the mobile terminal from normal operation by blocking the authentication module from transmitting the received authentication-related information to a base station, so as to interrupt an authentication process being performed for a mobile terminal user.

11. The mobile terminal in which network/card locking is implemented according to claim 9,
wherein the control module blocks the mobile terminal from normal operation by blocking the authentication module from transmitting the received authentication-related information to a base station, so as to interrupt an authentication process being performed for a mobile terminal user.

12. The mobile terminal in which network/card locking is implemented according to claim 8, further comprising: a call module and/or a short message sending and receiving module;
the main board further comprises: a fourth pad connected to the second pad; and/or a fifth pad connected to the second pad;
wherein the call module is connected to the fourth pad, and is configured to perform voice services of the mobile terminal;
the short message sending and receiving module is connected to the fifth pad, and is configured to perform short message sending and receiving services of the mobile terminal; and
wherein the control module blocks the mobile terminal from normal operation by disabling the call module and/or the short message sending and receiving module of the mobile terminal.

13. The mobile terminal in which network/card locking is implemented according to claim 9, further comprising: a call module and/or a short message sending and receiving module;
the main board further comprises: a fourth pad connected to the second pad; and/or a fifth pad connected to the second pad;
wherein the call module is connected to the fourth pad, and is configured to perform voice services of the mobile terminal;
the short message sending and receiving module is connected to the fifth pad, and is configured to perform short message sending and receiving services of the mobile terminal; and
wherein the control module blocks the mobile terminal from normal operation by disabling the call module and/or the short message sending and receiving module of the mobile terminal.

* * * * *